Figure 1:
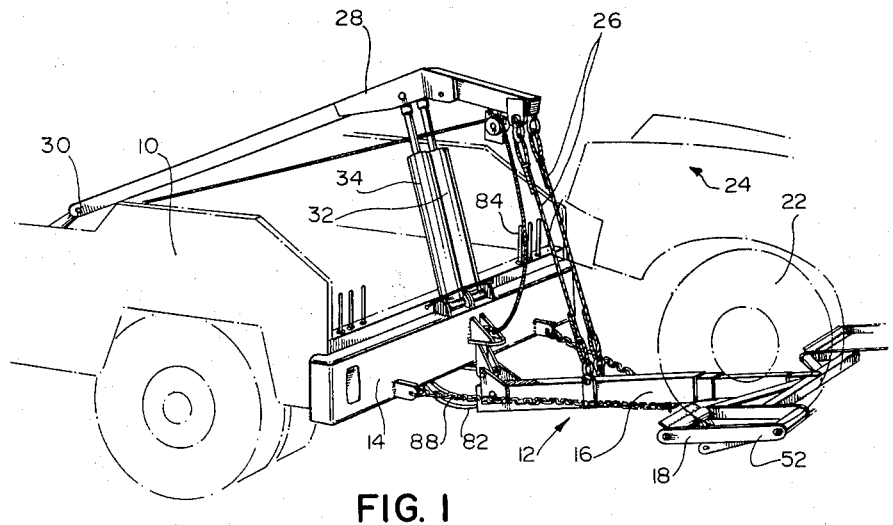

United States Patent [19]

Pigeon

[11] 3,924,763

[45] Dec. 9, 1975

[54] VEHICLE TOWING DEVICE

[76] Inventor: Norbert G. Pigeon, Ste-Madeleine, Ste-Hyacinthe, Quebec, Canada

[22] Filed: Nov. 14, 1974

[21] Appl. No.: 523,660

[52] U.S. Cl. .............................................. 214/86 A
[51] Int. Cl.² .......................................... B60P 3/12
[58] Field of Search .................... 214/86 A; 280/402

[56] References Cited
UNITED STATES PATENTS

| | | | |
|---|---|---|---|
| 3,434,607 | 3/1969 | Nelson | 214/86 A |
| 3,599,811 | 8/1971 | Watkins | 214/86 A |
| 3,667,630 | 6/1972 | Scott | 214/86 A |
| 3,690,482 | 9/1972 | Gaumont | 214/86 A |
| 3,825,132 | 7/1974 | Colangelo | 214/86 A |

*Primary Examiner*—Albert J. Makay
*Attorney, Agent, or Firm*—Roland L. Morneau

[57] ABSTRACT

A vehicle towing device mounted at the rear of a truck. The device is made of an extensible beam projecting rearwardly from the truck and pivotally mounted therefrom, a cross-bar fixed at the free end of the beam in a horizontal position, a shallow trough-like member having a rigid contour secured at each end of the cross-bar, means for pivotally moving the beam about the horizontal axis, the trough-like member adapted to contact the ground when the beam is in its lowermost position, means for longitudinally varying the length of said beam, wherein the troughs when located in contact with the ground are adapted to receive two wheels of the vehicle to be towed and to be subsequently raised into a towing positon from under the wheels.

10 Claims, 3 Drawing Figures

VEHICLE TOWING DEVICE

The present invention relates to a car towing device and in particular to such a device which raises the front or rear wheels of the car above the ground in order to pull it.

The common way for pulling a car consists of hooking a chain or a brace to its bumper or its undercarriage and pulling therefrom. When the front or rear part of the car is not in condition for supporting itself due to some mechanical defect or to an accident, one end of the car must be raised by pulling upwardly on the bumper or on the undercarriage.

Experience has demonstrated that the pulling action exerted on the bumper or the undercarriage can result in the damaging of some parts of the car. This is due to the increased weight of the new cars, their increased fragility and their particular design.

The present invention contemplates to raise the car exactly as it is intended to run, that is, from under the wheels. A car is engineered so as to be supported by its four wheels and can run safely on two end wheels as long as the two other end wheels are well and evenly supported.

The present invention consists of a car towing device adapted to be mounted at the rear of a truck for towing a vehicle. The device comprises an extensible beam projecting rearwardly from the vehicle and pivotally mounted therefrom along a vertical plane; a cross-bar fixed at the free end of said beam in a horizontal position; a shallow trough-like member having a rigid contour secured at each end of the cross-bar; means for pivotally moving said beam about a horizontal axis, the trough-like member adapted to contact the ground when the beam is in its lowermost position; means for longitudinally varying the length of the said beam, wherein the troughs, when located in contact with the ground, are adapted to receive two wheels of the vehicle to be towed and to be subsequently raised into a towing position.

The cross-bar is pivoted about an axis coaxial with the beam and about a vertical axis at one end of the beam. The beam is pivoted about a horizontal axis. The wheels are adapted to sink slightly in the troughs so as to be held thereinside when the troughs are raised but free to run thereoutside when the troughs touch the ground.

Figure 3:
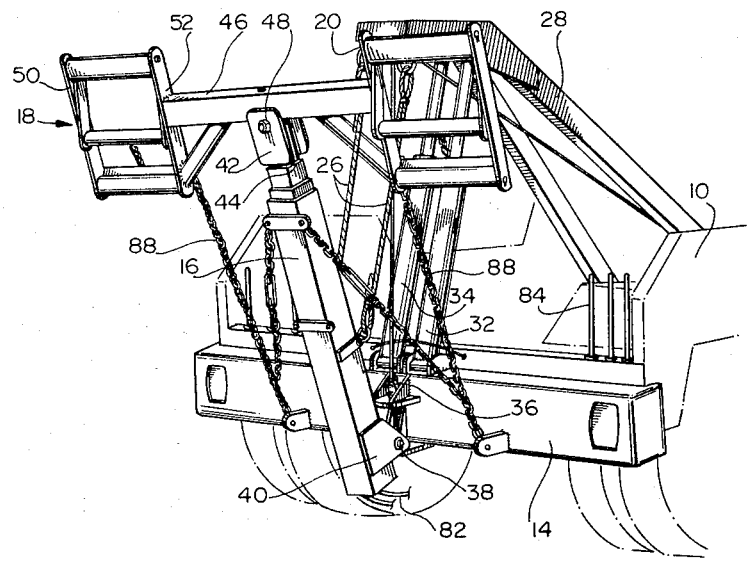
Figure 2:
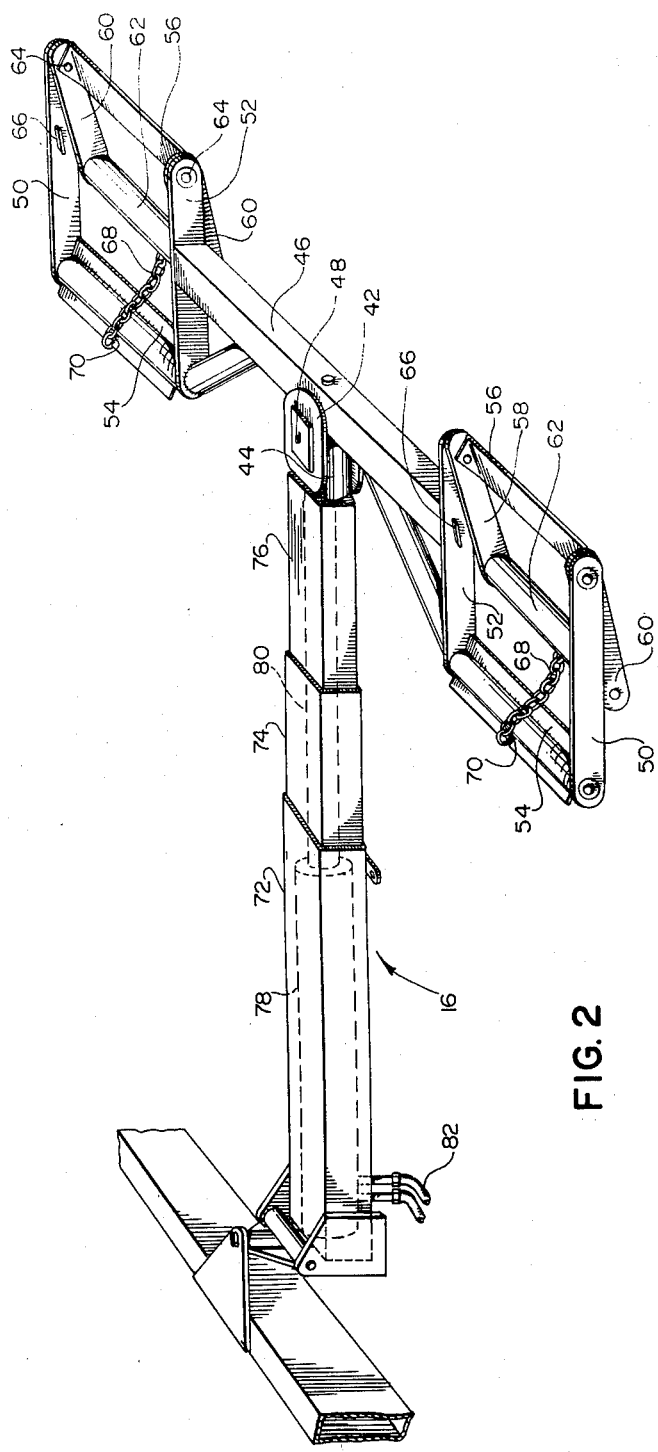

The invention will now be described in details by referring to drawings in which;

FIG. 1 is a perspective view of the towing truck pulling a vehicle with the vehicle towing device according to the new invention, FIG. 2 is a perspective view of the vehicle towing device shown in FIG. 1, and FIG. 3 is a perspective view of the towing vehicle with the towing device in a raised position.

FIG. 1 illustrates a towing truck 10 at the rear of which is secured a vehicle towing device 12. The device 12 comprises a reinforced bumper 14 an extensible beam 16, a pair of troughs 18 and 20 in which are mounted the front wheels 22 of a towed vehicle 24. A pair of chains 26 are hooked between the beam 16 and a pair of booms 28. The booms 28 are pivotable at their rear end 30 and are raised and lowered by a pair of pneumatic cylinders extending between the booms 28 and the bumper 14. The two hydraulic cylinders 32 and 34 are connected to the bumper substantially above the rear end of the beam 16 so as to exert a downward thrust substantially in line with the upward thrust caused by the rear end of the beam 16. The rear end of the beam 16 is connected to the bumper by a double linkage which permits a vertical and a horizontal movement to the beam 16. The axle 36 is secured to the bumper 14 in a vertical direction so as to allow the beam to move sideways while an axle 38 passing through the plates 40 on each side of the beam 16 and through the lower part of the axle 36 enables the beam 16 to move vertically.

At the forward end of the beam 16, is mounted a stirrup-shaped bracket 42 rotatable about an axle 44 axially aligned with the longitudinal axis of the beam 16. The bracket 42 retains a cross-bar 46 so that the latter can pivot about an axle 48 passing through the bracket 42 and the cross-bar 46.

At each end of the cross-bar 46 is solidly secured the trough members 18 and 20 adapted to receive the front or rear wheels of the towed vehicle. Each trough member is particularly designed so as to enable the easy transfer of the wheels inside and outside the trough member. Each trough member 18 and 20 consists essentially of a rectangular frame made of two lateral rigid blades 50 and 52, a rear slanted blade 54 and a pivotable forward blade 56. Blades 54 and 56 are tilted so as to form a V shape which is a better supporting surface for receiving the wheel of a vehicle. The front blade 56 is secured at each end to a pair of secondary blades 58 and 60 and a small drum 62 is secured at the rear end of the secondary blades 58 and 60 located somewhere around the middle axis of the trough members 18 and 20. The drum 62 pivots about the axis 64 but its movement is restricted in its upward direction by a stop member 66 fixed on the sides of the blades 50 and 52 and in its downward movement by a chain 68 which grips into a notch 70 provided in the upper surface of the forward blade 56. The downward movement of the drum 62 can therefore be adjusted at will by hooking the chain 68 in the notch 70 according to the size of the vehicle to be towed. With this arrangement of the trough member, it can be realized that when the trough comes in contact with the ground, it pushes upwardly the drum 62 so that the front blade 56 will facilitate the introduction or rolling of the wheel into the trough member on account of its substantially horizontal position, but will immediately tilt inwardly when the wheel will reach the drum 62. The lowest position of the drum 62 is adapted so as to correspond to the circumference of the tire resting on the front and rear blades 54 and 56. When the towed vehicle will be released from the towing truck, the troughs 18 and 20 are lowered in contact with the ground which pushes upwardly the drum 62, tilts the blade 54 rearwardly and consequently, facilitates the removal of the wheels from the trough.

In order to reach the stranded vehicle when the truck cannot approach it sufficiently, the beam 16 is adapted to vary in length. As shown in FIG. 2, the beam 16 is made of square-sectional channels 72, 74 and 76 of reduced sizes so as to slide one into the other by means of a hydraulic cylinder 78 located inside the channel 72 and a piston 80 located inside the channels 74 and 76. This beam 16 may vary from a length of four to eight feet. The hydraulic cylinder is controlled a liquid coming from the tubular members 82 and the handles 84 located at the rear of the towing truck.

Once the troughs have been pushed underneath the wheels of the car to be towed, the hydraulic cylinder 78 is actuated so as to bring the car as close as possible to the truck and then the hydraulic cylinders 32 and 34 are actuated so as to raise the booms 28 and accordingly the chains 26 which are hooked to the beam 16. This will lift the wheels and raise the end of the car above the ground at a sufficient height so as to safely pull the car.

A pair of chains 86 are also provided on each side of the beam 16 and connected to the bumper 14 so as to maintain the beam 16 substantially in a straight direction behind the truck and therefore preventing a wobbling effect of the car.

Additional chains 88 are also provided for maintaining the troughs 18 and 20 in a steady position when the latter are raised as shown in FIG. 3 and not in use.

It should be obvious that other components could be used with the towing device as described above. For instance, a winch may be used with an additional cable to pull on cars which are too far to reach with the beam 16 and also for the purpose of holding the car in the troughs when the car is towed.

What I claim:

1. A vehicle towing device adapted to be mounted at the rear of a truck for towing a vehicle, the said device comprising;
   an extensible beam projecting rearwardly from the vehicle and pivotally mounted therefrom along a vertical plane,
   a cross-bar fixed at the free end of said beam in a horizontal position,
   a shallow trough-like member having a rigid peripheral frame adapted to receive a segment of the tires of the wheels of the towed vehicle, the said frame being secured to said cross-bar so that the axis of the wheel is substantially in the plane of the cross-bar, the frame comprising a central rod pivotally mounted to the forward portion of the frame, the lowermost position of said rod being located below the said peripheral frame, wherein, when the frame is lowered in contact with the ground, the said rod raises the wheel out of the frame.

2. A device as recited in claim 1, wherein the said forward portion is a rigid flat blade pivotally mounted with said rod, 3. A device as recited in claim 2, comprising a flexible link member releasably connecting the rod and the rear portion of the frame, the said link member being releasably connected at various longitudinal dimensions so as to change the lowermost position of the rod.

4. A device as recited in claim 2, comprising a stop member secured to the frame for restricting the upward movement of the rod.

5. A device as recited in claim 2, wherein the rear of said beam is fixed to a rigid horizontal frame secured at the rear of the truck.

6. A device as recited in claim 2, comprising a first means for pivoting the cross-bar about an axis coaxial with the said beam.

7. A device as recited in claim 6, comprising a second means for pivoting the cross-bar about a vertical axis at the end of the said beam remote from the truck.

8. A device as recited in claim 7, comprising a third means for pivoting the beam about a vertical axis to the rear end of the vehicle.

9. A device as recited in claim 1, wherein the said means for longitudinally varying the length of said beam comprises a hydraulic cylinder.

10. A device as recited in claim 9, wherein the hydraulic cylinder is mounted inside said beam and secured at each end thereof.

* * * * *